US009485476B2

(12) United States Patent
Rhoden et al.

(10) Patent No.: US 9,485,476 B2
(45) Date of Patent: Nov. 1, 2016

(54) WIRELESS ACQUISITION OF DIGITAL VIDEO IMAGES

(71) Applicants: R. Clayton Rhoden, Houston, TX (US); Richard Charles Rhoden, Friendswood, TX (US); James Braden Hoffman, League City, TX (US)

(72) Inventors: R. Clayton Rhoden, Houston, TX (US); Richard Charles Rhoden, Friendswood, TX (US); James Braden Hoffman, League City, TX (US)

(73) Assignee: TARGETVISION, LLC, Webster, TX (US)

( * ) Notice: Subject to any disclaimer, the term of this patent is extended or adjusted under 35 U.S.C. 154(b) by 456 days.

(21) Appl. No.: 13/950,520

(22) Filed: Jul. 25, 2013

(65) Prior Publication Data

US 2014/0198209 A1    Jul. 17, 2014

Related U.S. Application Data

(60) Provisional application No. 61/753,077, filed on Jan. 16, 2013, provisional application No. 61/819,016, filed on May 3, 2013.

(51) Int. Cl.
*H04N 9/47* (2006.01)
*H04N 7/18* (2006.01)
*H04L 12/46* (2006.01)

(52) U.S. Cl.
CPC ........... *H04N 7/183* (2013.01); *H04L 12/4604* (2013.01)

(58) Field of Classification Search
CPC .............................. H04L 12/462; H04N 7/188
USPC ......................................................... 348/143
See application file for complete search history.

(56) References Cited

U.S. PATENT DOCUMENTS 5,437,104 A * 8/1995 Chien .................... G03B 17/06
33/266
2012/0327225 A1* 12/2012 Barley ................... H04N 7/188
348/143

* cited by examiner

*Primary Examiner* — Hung Dang
*Assistant Examiner* — Girumsew Wendmagegn
(74) *Attorney, Agent, or Firm* — King & Spalding LLP

(57) ABSTRACT

A system can include a first transmitter unit having a first communication engine that controls a first local network, where the first transmitter unit is positioned at a first location. The system can also include a first remote device communicably coupled, using the first local network, to the first transmitter unit. The system can further include a receiver unit having a second communication engine that controls a second local network, where the receiver unit is positioned at a second location. The system can also include a smart device having an application that is communicably coupled, using the second local network, to the receiver unit. The system can further include a bridge network that wirelessly communicably couples the first transmitter unit to the receiver unit. The first local network and the second local network are wireless networks.

20 Claims, 8 Drawing Sheets

WIRELESS ACQUISITION OF DIGITAL VIDEO IMAGES

CROSS-REFERENCE TO RELATED APPLICATIONS

This application claims priority under 35 U.S.C. §119 to U.S. Provisional Patent Application Ser. No. 61/753,077, titled "Methods, Systems, and Devices For Wirelessly Acquiring a Digital Video Image" and filed on Jan. 16, 2013, the entire contents of which are hereby incorporated herein by reference.

This application also claims priority under 35 U.S.C. §119 to U.S. Provisional Patent Application Ser. No. 61/819,016, titled "Methods, Systems, and Devices For Wirelessly Acquiring a Digital Video Image" and filed on May 3, 2013, the entire contents of which are hereby incorporated herein by reference.

TECHNICAL FIELD

The present disclosure relates generally to transferring digital images, and more particularly, to the wireless transmission of digital images.

BACKGROUND

Spotting scopes allow users to view different subjects clearly from a distance in a number of different applications (e.g., surveillance, nature-watching, shooting, general long distance observation). Traditional optics-based spotting scopes have limits in the distances that can be seen clearly. For example, the distances at which an object is located relative to a spotting scope can simply be too great for a portable scope to be able to see with any usable resolution. As another example, an optics-based spotting scope may require a line-of-sight from the scope to the target. Thus acquisition of the target may not be achievable using a traditional spotting scope.

SUMMARY

In general, in one aspect, the disclosure relates to a system. The system can include a first transceiver unit having a first communication engine that controls a first local network, where the first transceiver unit is positioned at a first location. The system can also include a first remote device communicably coupled, using the first local network, to the first transceiver unit. The system can further include a second transceiver unit having a second communication engine that controls a second local network, where the second transceiver unit is positioned at a second location. The system can also include a smart device having an application that is communicably coupled, using the second local network, to the second transceiver unit. The system can further include a bridge network that wirelessly communicably couples the first transceiver unit to the second transceiver unit. The first local network and the second local network can be wireless networks. In another aspect, the disclosure can generally relate to a method for providing downrange information. The method can include collecting, using a first remote device, the downrange information, and transmitting, using a first local network, the downrange information collected by the first remote device from the first remote device to a first transceiver unit. The method can also include wirelessly transmitting, using a bridge network, the downrange information from the transmitter unit to a second transceiver unit. The method can further include transferring, using a second local network, the downrange information from the receiver unit to a smart device. The downrange information can be processed using an application on the smart device.

In another aspect, the disclosure can generally relate to a method for controlling a downrange device. The method can include sending, using an application on a smart device and a first local network, instructions from the smart device to a first transceiver unit. The method can also include wirelessly transmitting, using a bridge network, the instructions from the first transceiver unit to a second transceiver unit, where the first transceiver unit is located remotely from the second transceiver unit. The method can further include sending, using a second local network, the instructions from the second transceiver unit to the downrange device. The downrange device can be controlled using the instructions.

These and other aspects, objects, features, and embodiments will be apparent from the following description and the appended claims.

BRIEF DESCRIPTION OF THE DRAWINGS

The drawings illustrate only example embodiments of wirelessly acquiring digital video images and are therefore not to be considered limiting of its scope, as wirelessly acquiring digital video images may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
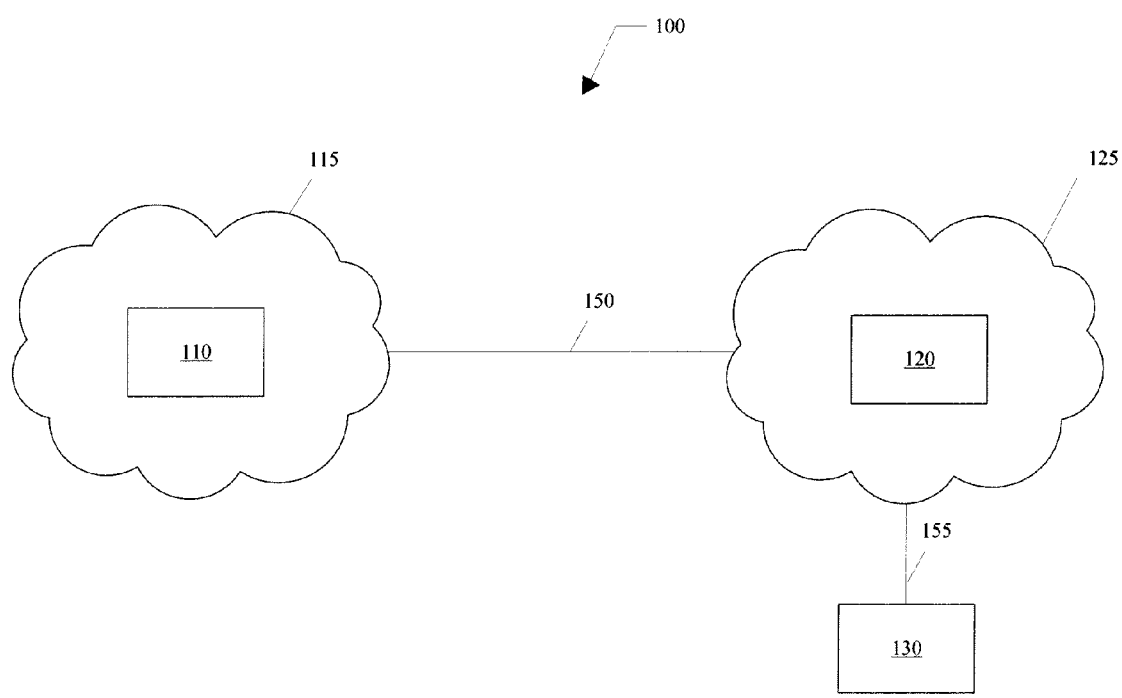
FIG. 1 shows an example communication system for wirelessly acquiring digital video images in accordance with certain example embodiments.

Example embodiments of wirelessly acquiring digital video images will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments herein may be practiced without these specific details. In other instances, well-known features have not been described in detail to avoid unnecessarily complicating the description. As used herein, a length, a width, and height can each generally be described as lateral directions.

Generally, example embodiments described herein allow a user to remotely communicate with one or more remote devices. Example embodiments described herein can be used in a number of applications that may or may not apply to wirelessly acquiring digital video images. For example, example embodiments can be used on gun ranges (e.g., private, public, government). More specifically, example embodiments can be used, for example, to show where a target was hit for a shooter on a gun range (as for scoring in a competition) and/or to change a spent target for a new target on a gun range. As another example, example embodiments can be used while hunting. More specifically, example embodiments can be used, for example, to create a perimeter watch, to focus on a target area, and to seek a different target. A digital video image as described herein can be one or more discrete still pictures capturing an image or a series of consecutive pictures (e.g., a movie, a live feed) capturing the image.

As yet another example, example embodiments can be used by law enforcement. More specifically, example embodiments can be used for surveillance (as on stake-outs) and traffic monitoring. As still a further example, example embodiments can be used by a number of entities (law enforcement, private security) for security. More specifically, example embodiments can be used to monitor an area and/or perimeter. While the example embodiments described herein are directed to certain applications (e.g., hunting, target range shooting, surveillance, security), example embodiments can also be used for other types of applications (e.g., remote monitoring and/or control). Therefore, example wirelessly acquiring digital video images described herein should not be considered limited to the embodiments specifically described herein.

In addition, or in the alternative, example embodiments can be used to control one or more remote devices (also called downrange devices) to aid in wirelessly acquiring digital video images. For example, example embodiments can allow a user to control a position (e.g., redirect (pan), tilt, zoom) of a camera or other remote device for wirelessly acquiring digital video images. As another example, example embodiments can allow a user to turn on a light source to aid in capturing a digital video image of a target. As yet another example, example embodiments can allow a user to change and/or reset a shooting target on a gun range.

As described herein, a user may be any person that interacts with an example system and/or device for wirelessly acquiring a digital video image. Examples of a user may include, but are not limited to, a hunter, security personnel, law enforcement personnel, a target shooter, an engineer, an electrician, an instrumentation and controls technician, a mechanic, an operator, a consultant, a contractor, an employee, and a manufacturer's representative. Further, a transceiver can transmit and/or receive signals. In other words, a transceiver can act as both a transmitter and a receiver.

FIG. 1 shows an example communication system 100 for wirelessly acquiring digital video images in accordance with certain example embodiments. In one or more embodiments, one or more of the features shown in FIG. 1 may be omitted, repeated, and/or substituted. Accordingly, embodiments of communication systems for wirelessly acquiring digital video images should not be considered limited to the specific arrangements of components shown in FIG. 1.

Referring now to FIG. 1, the communication system 100 in this example includes a transceiver 110 (also called a transceiver unit), a transceiver 120 (also called a transceiver unit), a wireless network 150 (also called a bridge network) communicatively coupled to the transceiver 110 and the transceiver 120, and a user device 130 communicably coupled to the transceiver 120 using a network link 155. Details of the transceiver 110 are discussed below with respect to FIG. 2, and details of the transceiver 120 are discussed below with respect to FIG. 3. The transceiver 110 can have its own local network 115, and the transceiver 120 can have its own local network 125.

In certain example embodiments, the bridge network 150 (also called a wireless fidelity or WiFi network) is a wireless network that communicably couples the transceiver 110 and the transceiver 120 over a relatively long distance compared to the scope of the local network 115 and the local network 125. The bridge network 150 can be created by two high power directional access points that are in access point bridge mode with dynamic host configuration protocol (DHCP) enabled, enabling both the wireless interconnection of these access points and the ability to share data with locally connected devices. The use of DHCP by the bridge network 150 can be one or more of a number of protocols used to transfer information (data) between the transceiver 110 and the transceiver 120. The bridge network 150 can, in some cases, have a line of sight between the transceiver 110 and the transceiver 120. In such a case, the distance between the transceiver 110 and the transceiver 120 can be greater than if the bridge network 150 is generally broadcast (no line of sight).

The local network 115 can be a sub network of the bridge network 150. Alternatively, the local network 115 can be a separate network from the bridge network 150. As yet another alternative, the local network 115 can be the same network as the bridge network 150 but have a different DHCP address range. The local network 115 can use a wireless and/or wired technology. The local network 115 can use DHCP or some other protocol, where the protocol has a range. The local network 115 can allow a user to transfer data to and/or receive data from the transceiver 110.

Similarly, the local network 125 can be a sub network of the bridge network 150. Alternatively, the local network 125 can be a separate network from the bridge network 150. As yet another alternative, the local network 125 can be the same network as the bridge network 150 and the local network 115 but have a different DHCP address range. The local network 125 can use a wireless and/or wired technology. The local network 125 can use DHCP or some other protocol, where the protocol has a range. The DHCP range for the protocol of the local network 125 can be the same or different than the range for the DHCP protocol of the local network 115 to prevent miscommunication within the system.

The local network 125 can allow a user to transfer data to and/or receive data from the transceiver 120. In certain example embodiments, if one of the local networks (e.g., local network 125) does not use DHCP, then the other local network (e.g., local network 115) does use DHCP. Using DHCP (or other similar protocols) in one or more of the local networks (e.g., local network 115, local network 125) can allow a user to more easily transition between local network 115 and local network 125, reducing the risk for an error in data transfer between the local networks.

The user device 130 is a mobile computing device that includes a user interface (e.g., display, keyboard, mouse, voice recognition), a hardware processor, and a communication engine that communicates with the transceiver 120 and/or the transceiver 110 using the network link 155. The network link 155 allows the user, using the user device 130, to send data (e.g., instructions) to and/or receive data (e.g., digital images) from the transceiver 120 and/or the transceiver 110. The network link 155 can use wired and/or wireless technology to allow communication between the user device 130 and the transceiver 120 and/or the transceiver 110. The network link 155 can be configured such that the user device 130 must be in range of a local network (e.g., local network 115, local network 125) for the user device 130 to communicate with the transceiver 120 and/or the transceiver 110. Examples of a user device 130 can include, but are not limited to, a laptop computer, a smart phone, a tablet, a digital watch, and a personal digital assistant.

In certain example embodiments, the range of the local network 115 and the range of the local network 125 is represented by the respective boundaries shown in FIG. 1. If a user device 130 is located outside the range of either of these local networks, the user device 130 may not be able to communicate with the transceiver 120 and/or the transceiver 110. For example, the range of the local network 115 and the range of the local network 125 can each be approximately 25 or 50 feet. By contrast, the range of the bridge network 150 can be approximately one mile (e.g., if there is a clear line of site between the access points of the transceiver 110 and the transceiver 120). Alternatively, the range of the bridge network 150 can be less than one mile or more than one mile.

Figure 2:
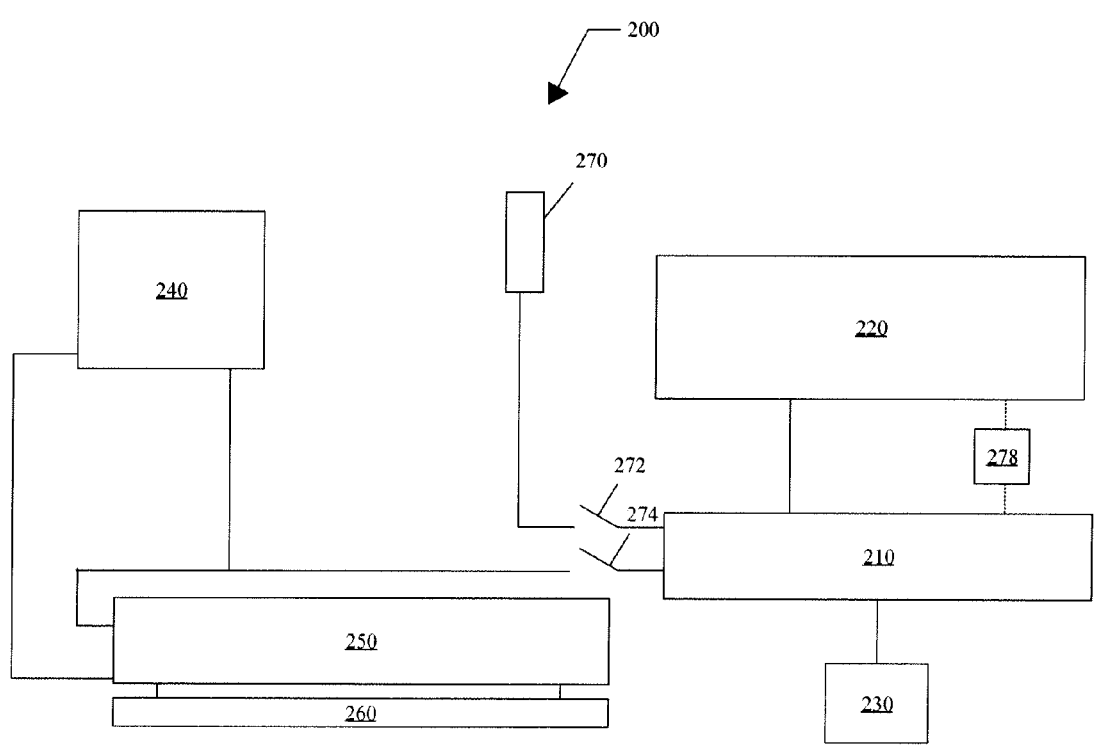
FIG. 2 shows a system diagram of an example transceiver for wirelessly acquiring digital video images in accordance with certain example embodiments.

FIG. 2 shows a system diagram of an example transceiver 110 for wirelessly acquiring digital video images in accordance with certain example embodiments. In one or more embodiments, one or more of the features shown in FIG. 2 may be omitted, repeated, and/or substituted. Accordingly, embodiments of communication systems for a transceiver for wirelessly acquiring digital video images should not be considered limited to the specific arrangements of components shown in FIG. 2.

Referring to FIGS. 1 and 2, the transceiver 110 of FIG. 2 can include one or more remote devices 240 (also called downrange devices), a communication engine 250, an antenna 260, one or more switches (e.g., switch 272, switch 274, switch 278), a protection circuit 210, a power outlet 230, a power supply 220, and an alignment device 270. In certain example embodiments, each remote device 240 is a device that receives data (e.g., instructions) and/or sends data (e.g., digital images). The remote device 240 can be perform active functions (e.g., remove a spent shooting target, install a fresh target, turn on a light) and/or perform passive functions (e.g., capture digital images, collect weather data, keep time). Regardless of the type of functions performed by a remote device 240, such remote device 240 can send and/or receive signals.

The data can be sent and/or received by the remote device 240 through the local network 115 controlled by the communication engine 250. The remote device 240 can be positioned within, on, and/or remote from a housing of the transceiver 110. Examples of a remote device 240 can include, but are not limited to, a camera (e.g., a pan-tilt-zoom camera, an infrared camera, an internet protocol (IP) camera, a camera with night vision capability), a target changer, a light source, a motion sensor, and a wind gauge. The remote device 240 can be communicably coupled to the communication engine 250. Further, the remote device 240 can be electrically coupled to the protection circuit 210, described below, to receive power that the remote device 240 may need to operate.

In applications where the remote device 240 is a camera, the camera can have a powerful lens (e.g., a 25 mm lens) that allows the remote device 240 to focus in closer and provide more detail of the object whose image is being captured. In such a case, the zoom and/or direction of the lens of the camera (remote device 240) can be adjustable and controlled by the user during setup. Having a stronger camera lens allows the transceiver unit 120 to be set further back from the target and minimizes the risk of being hit with splatter or other debris (as in a hunting application) while down range and proximate to the target. This lens in the camera can be replaceable with other lenses, depending on the application.

In certain example embodiments, the communication engine 250 of the transceiver 110 controls the local network 115 (as described above) and the position of the antenna 260. The communication engine 250 can also facilitate the transfer of data between (is communicably coupled to) each remote device 240 and the transceiver 120, as described below with respect to FIG. 3. The communication engine 250 can be, or can include, a server. The communication engine 250 can be electrically coupled to the protection circuit 210 to receive power that the communication engine 250 may need to operate.

The communication engine 250 can include a high power directional access point to create the wireless bridge network 150 between the transceiver 110 and the transceiver 120. In addition, or in the alternative, the communication engine 250 can include an omnidirectional access point (using, for example, a DHCP server), which allows a user to communicate with the remote device 240.

The antenna 260 can provide control for directing the bridge network 150. For example, if the antenna 260 is pointed generally toward the transceiver 120 (or, more specifically, toward the antenna 360 of the transceiver 120), than the bridge network 150 can allow the transceiver 110 and the transceiver 120 to effectively communicate (send and receive data) over a greater distance than without the antenna 260. The antenna 260 can be stand-alone. Alternatively, the antenna 260 can be integrated with the communication engine 250. The antenna 260 can have a fixed or variable length.

In certain example embodiments, the protection circuit 210 protects the power supply 220 and/or the power outlet 230 from adverse electrical conditions (e.g., power surge, ground fault). In addition, or in the alternative, the protection circuit 210 can protect the communication engine 250 and/or the remote device 240 from such adverse electrical conditions. The protection circuit 210 can control one or more switches (e.g., switch 272, switch 274) based on one or more thresholds (e.g., current, temperature) being exceeded. One or more switches can also be operated manually or remotely. For example, optional switch 278 can be a radio frequency-controlled power switch, controlled by a user, that allows the protection circuit 210 to receive power from the power supply 220. Each switch can be used to control power and/or control to one or more components of the transceiver 110.

The protection circuit 210 can include one or more of a number of discrete components (e.g., resistors, capacitors), an integrated circuit, a combination of software and hardware, some other part, or any combination thereof. The protection circuit 210 can have one or more thresholds that, once exceeded (too high, too low), cause the protection circuit 210 to operate a switch. The thresholds of the protection circuit 210 can be set and/or modified by default, by a user, automatically, and/or by some other mechanism. The thresholds of the protection circuit 210 can be set and/or modified remotely or at the protection circuit 210.

The power supply 220 can provide power, through the protection circuit 210, to one or more components (e.g., remote device 240, communication engine 250) of the transceiver 110. The power supply 220 can be electrically coupled to the protection circuit 210. The power supply 220 can be one or more of a number of types of power source, including but not limited to a battery pack and a photovoltaic solar system. The power supply 220 can be rechargeable, which allows the power supply 220 to be charged evenly and prevents the power supply 220 from discharging too quickly and/or from having a charge that is too low.

The power outlet 230 can be electrically coupled to the protection circuit 210. The power outlet 230 can be a type of receptacle (e.g., a 120 volt outlet) that electrically couples to a source of external power (e.g., a battery, a house circuit). In certain example embodiments, the power received by the power outlet 230 can be used for providing power to one or more components of the transceiver 110. For example, the power received by the power outlet 230 can be used to charge the power source 220 (e.g., battery pack).

The alignment device 270 can be electrically coupled to the protection circuit 210. In certain example embodiments, the alignment device 270 can also be communicably coupled to the communication engine 250. The alignment device 270 can be one or more devices that assist a user in remotely sending instructions to a remote device 240 so that the remote device 240 provides useful information (data) to the user. Examples of an alignment device 270 can include, but are not limited to, a laser, a sensor, and a ruler. The alignment device 270 can be a remote device 240 of the transceiver 110.

Figure 3:
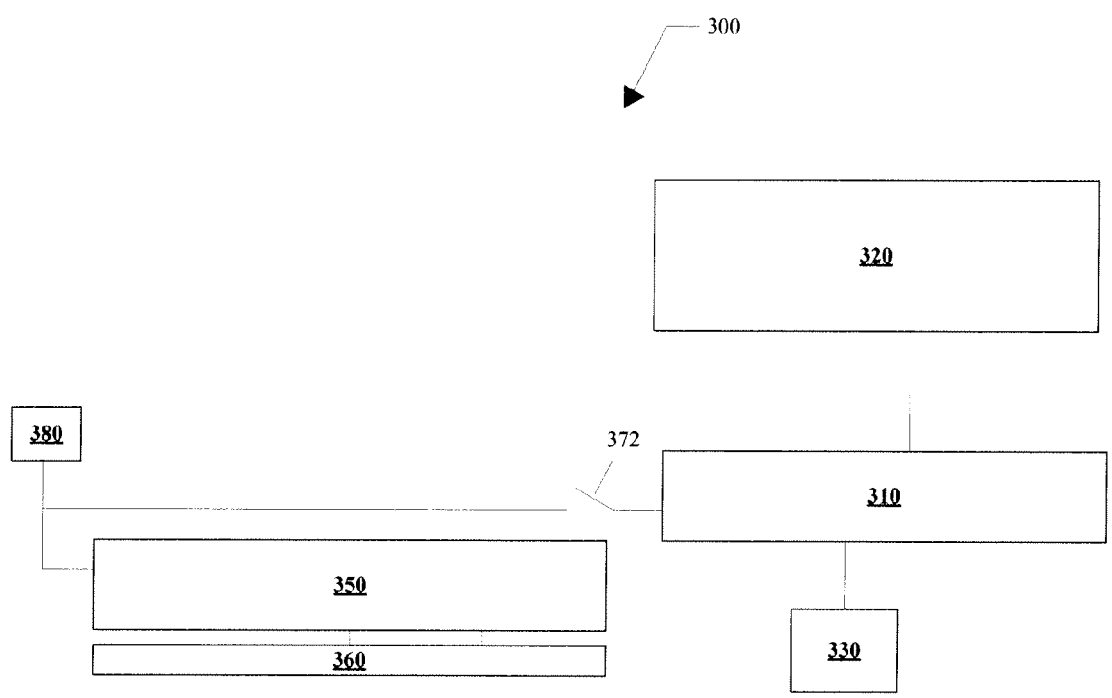
FIG. 3 shows a system diagram of another example transceiver for wirelessly acquiring digital video images in accordance with one or more example embodiments.

FIG. 3 shows a system diagram of another example transceiver 120 for wirelessly acquiring digital video images in accordance with one or more example embodiments. In one or more embodiments, one or more of the features shown in FIG. 3 may be omitted, repeated, and/or substituted. Accordingly, embodiments of communication systems for a transceiver for wirelessly acquiring digital video images should not be considered limited to the specific arrangements of components shown in FIG. 3.

Referring to FIGS. 1-3, the example transceiver 120 of FIG. 3 can include a communication engine 350, an antenna 360, one or more switches (e.g., switch 372), a protection circuit 310, a power supply 220, a power outlet 230, and a smart device outlet 380. Except as described below, the components of the transceiver 120 are substantially the same as the corresponding components of the transceiver 110 described above with respect to FIG. 2. For example, the communication engine 350 of the transceiver 120 can be substantially the same communication engine 250 of the transceiver 110.

In certain example embodiments, the smart device outlet 380 is electrically and/or communicably coupled to the communication engine 350 and/or the protection circuit 310. The smart device outlet 380 can be a type of receptacle (e.g., a universal serial bus port) that electrically couples to a smart device 130. When a smart device 130 is coupled to the transceiver 120 using the smart device outlet 380, the smart device 130 can receive power and/or data. In certain example embodiments, the power received by the smart device 130 through the smart device outlet 380 can be used for providing power to, and/or charging a battery of, the smart device 130. In addition, or in the alternative, a smart device outlet can also be part of one or more transceivers 110.

Figure 4:
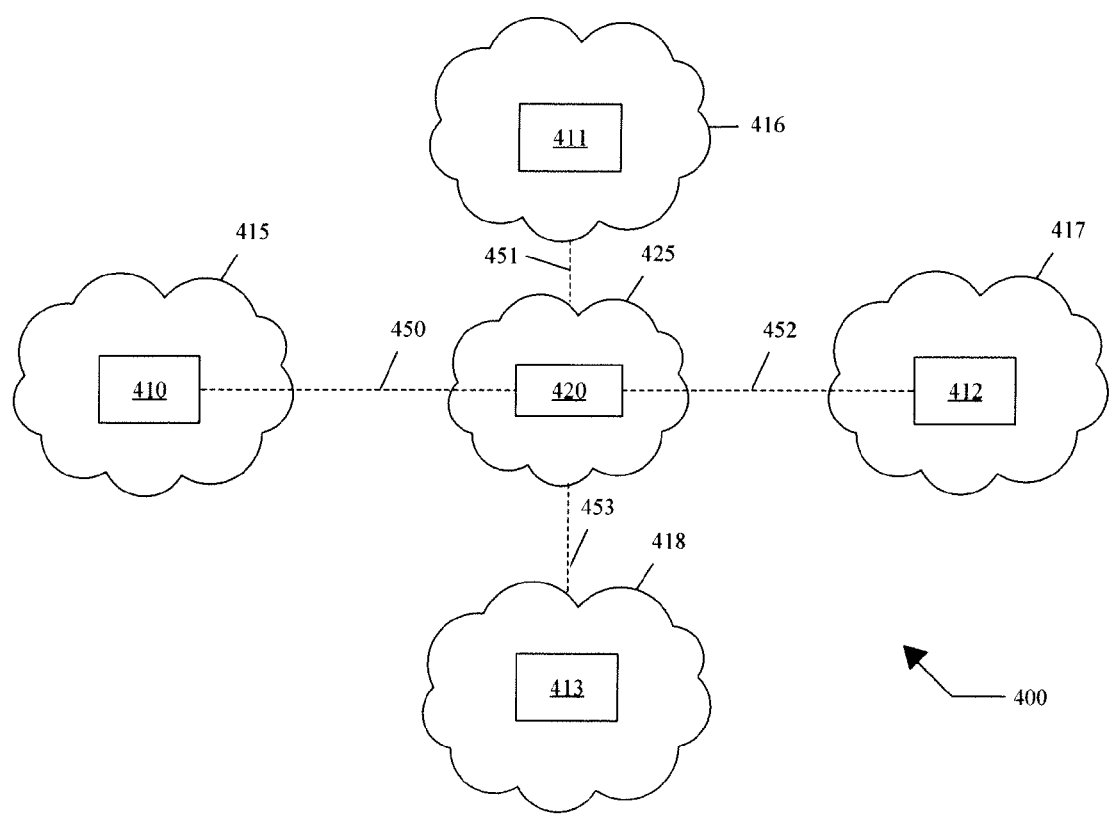
FIG. 4 shows another example communication system for wirelessly acquiring digital video images in accordance with one or more example embodiments.

FIG. 4 shows another example communication system 400 for wirelessly acquiring digital video images in accordance with one or more example embodiments. In one or more embodiments, one or more of the features shown in FIG. 4 may be omitted, repeated, and/or substituted. Accordingly, embodiments of communication systems for wirelessly acquiring digital video images should not be considered limited to the specific arrangements of components shown in FIG. 4.

Referring to FIGS. 1-4, the communication system 400 is similar to the system 100 of FIG. 1 above, except that the example system 400 of FIG. 4 includes a total of four transceivers (transceiver 410, transceiver 411, transceiver 412, and transceiver 413), each having a local network (local network 415, local network 416, local network 417, and local network 418). In certain example embodiments, each transceiver in FIG. 4 is substantially similar to the transceiver 110 described above with respect to FIG. 2. Alternately, the system 400 can include two transceivers, three transceivers, or more than four transceivers.

Each transceiver of the system 400 in FIG. 4 can be communicably coupled to the transceiver 420 (which can have its own local network 425, substantially similar to the transceiver 120 described above with respect to FIG. 3) by a bridge network. Specifically, the transceiver 410 can be communicably coupled to the transceiver 420 using bridge network 450; the transceiver 411 can be communicably coupled to the transceiver 420 using bridge network 451; the transceiver 412 can be communicably coupled to the transceiver 420 using bridge network 452; and the transceiver 413 can be communicably coupled to the transceiver 420 using bridge network 453. Each bridge network shown in FIG. 4 can be the same or different than the other bridge networks shown in FIG. 4.

The system 400 can be used in one or more of a number of applications. For example, system 400 can be used in competitive shooting applications (as for scoring), in military training, in surveillance applications, and/or in hunting applications (as to watch game traffic around the user). In certain example embodiments, one or more of the transceiver units may not include a local network. In some cases, one or more of the transceiver units can be set up and left because such a transceiver unit (and its associated remote device(s)) do not need much or any adjustment or other control by a remote user. In such cases, a transceiver may not have an accessible network.

Figure 5:
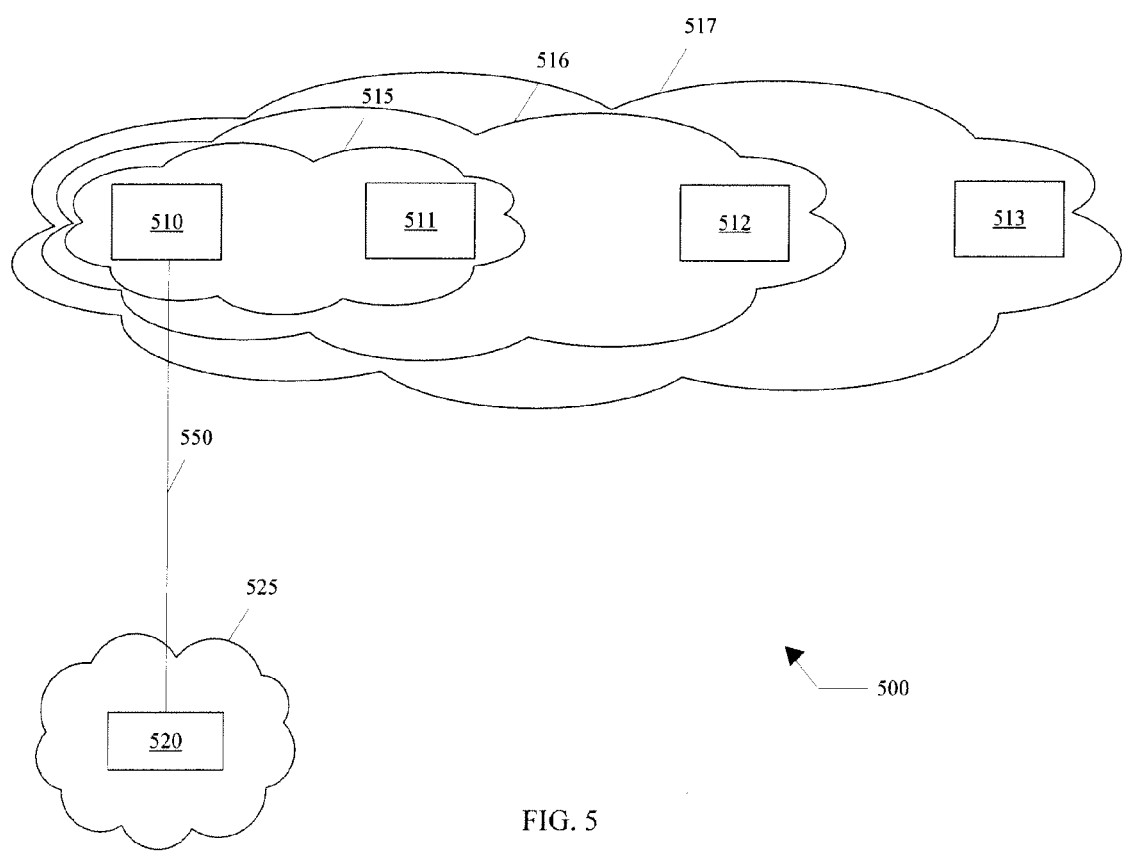
FIG. 5 shows yet another example communication system for wirelessly acquiring digital video images in accordance with one or more example embodiments.

FIG. 5 shows yet another example communication system 500 for wirelessly acquiring digital video images in accordance with one or more example embodiments. In one or more embodiments, one or more of the features shown in FIG. 5 may be omitted, repeated, and/or substituted. Accordingly, embodiments of communication systems for wirelessly acquiring digital video images should not be considered limited to the specific arrangements of components shown in FIG. 5.

Referring to FIGS. 1-5, the communication system 500 is similar to the system 100 of FIG. 1 above, except that the example system 500 of FIG. 5 includes a total of four transceivers (transceiver 510, transceiver 511, transceiver 512, and transceiver 513) that are communicably coupled to each other by local networks (local network 515, local network 516, and local network 517). In certain example embodiments, each transceiver in FIG. 5 is substantially similar to the transceiver 110 described above with respect to FIG. 2. Alternately, the system 500 can include two transceivers, three transceivers, or more than four transceivers.

While the transceiver 510 of the system 500 in FIG. 5 can be communicably coupled to the transceiver 420 (which can have its own local network 425, substantially similar to the transceiver 120 described above with respect to FIG. 3) by the bridge network 550, each of the other transceivers (transceiver 511, transceiver 515, and transceiver 513) is communicably coupled to transceiver 510 using local networks rather than to the transceiver 520. In other words, only transceiver 510 is communicably coupled to the transceiver 520 in the system 500. In this case, transceiver 510 can be communicably coupled to transceiver 511 using local network 515; transceiver 510 can be communicably coupled to transceiver 512 using local network 516; and transceiver 510 can be communicably coupled to transceiver 513 using local network 517. In certain example embodiments, the use of the local networks can eliminate the need for the antenna from transceiver 511, transceiver 512, and transceiver 513.

Each local network shown in FIG. 5 can be the same or different than the other local networks shown in FIG. 5. Further, the configuration of the local networks can vary. For example, the communication between transceiver 513 and transceiver 510 (and/or other non-adjacent transceivers) can be indirect (e.g., from transceiver 513 to transceiver 512 to transceiver 511 to transceiver 510). As a specific example, local network 517 can encompass transceiver 512 and transceiver 513; local network 516 can encompass transceiver 511 and transceiver 512; and local network 515 can encompass transceiver 510 and transceiver 511.

The system 500 of FIG. 5 can be used in one or more of a number of situations. For example, the system 500 can be used in a shooting competition, when there is a need to have multiple transceiver units near one another but far from the transceiver 525 and where there is a need to control and/or receive information from a remote device (downrange device) (e.g., a remotely controllable target changer, weather sensors) that is located within a local network of a transceiver. In such a case, each transceiver unit in the system 500 can have a its own local network.

In certain example embodiments, each local network associated with a transceiver unit allows the transceiver unit to communicate with transceiver 510. Transceiver 510, in turn, communicates with the transceiver 520 using the bridge network 550. A user can access the local network 525 of the transceiver 520 and send instructions to each transceiver to control a remote device (e.g., a camera, a target changer, a sensor, a relay) that is communicably coupled to one or more transceivers. The system 500 of FIG. 5 can also be used to connect to and/or control additional network devices (e.g., remotely controllable relays, weather sensors, lights, etc.) through the software of a remote device.

While the systems of FIGS. 4 and 5 show multiple transceivers in various configurations, it may be possible to have multiple transceivers in various other configurations, whether in series and/or in parallel with each other, in a network configuration. In addition, or in the alternative, there can be a series of two or more transceivers, each connected by a bridge network. In such a case, a transceiver can also include one or more components of a transceiver.

Figure 6:
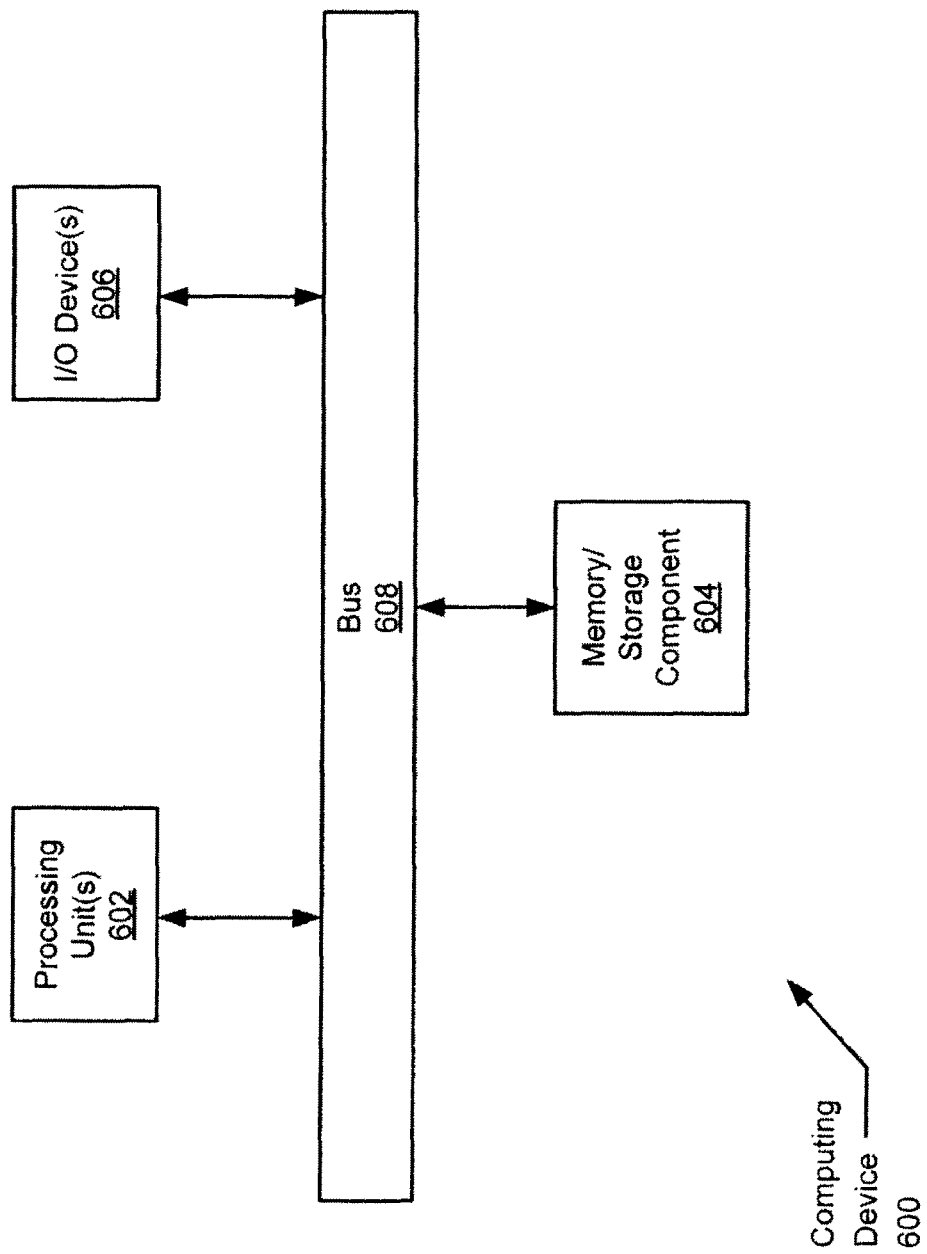
FIG. 6 shows a computing device in accordance with one or more exemplary embodiments.

FIG. 6 illustrates one embodiment of a computing device 600 (also called a computer system) that can implement one or more of the various techniques described herein, and which may be representative, in whole or in part, of the elements described herein. Computing device 600 is only one example of a computing device and is not intended to suggest any limitation as to scope of use or functionality of the computing device and/or its possible architectures. Neither should computing device 600 be interpreted as having any dependency or requirement relating to any one or combination of components illustrated in the example computing device 600.

Computing device 600 includes one or more processors or processing units 602, one or more memory/storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Memory/storage component 604 may include volatile media (such as random access memory (RAM)) and/or nonvolatile media (such as read only memory (ROM), flash memory, optical disks, magnetic disks, and so forth). Memory/storage component 604 can include fixed media (e.g., RAM, ROM, a fixed hard drive, etc.) as well as removable media (e.g., a Flash memory drive, a removable hard drive, an optical disk, and so forth).

One or more I/O devices 606 allow a customer, utility, or other user to enter commands and information to computing device 600, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 600 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 600 includes at least the minimal processing, input, and/or output means necessary to practice one or more embodiments.

Further, those skilled in the art will appreciate that one or more elements of the aforementioned computer device 600 may be located at a remote location and connected to the other elements over a network. Further, one or more embodiments may be implemented on a distributed system having a plurality of nodes, where each portion of the implementation (e.g., communication engine 250, protection circuit 310, remote device 240) may be located on a different node within the distributed system. In one or more embodiments, the node corresponds to a computer system. Alternatively, the node may correspond to a processor with associated physical memory. The node may alternatively correspond to a processor with shared memory and/or resources.

Figure 7:
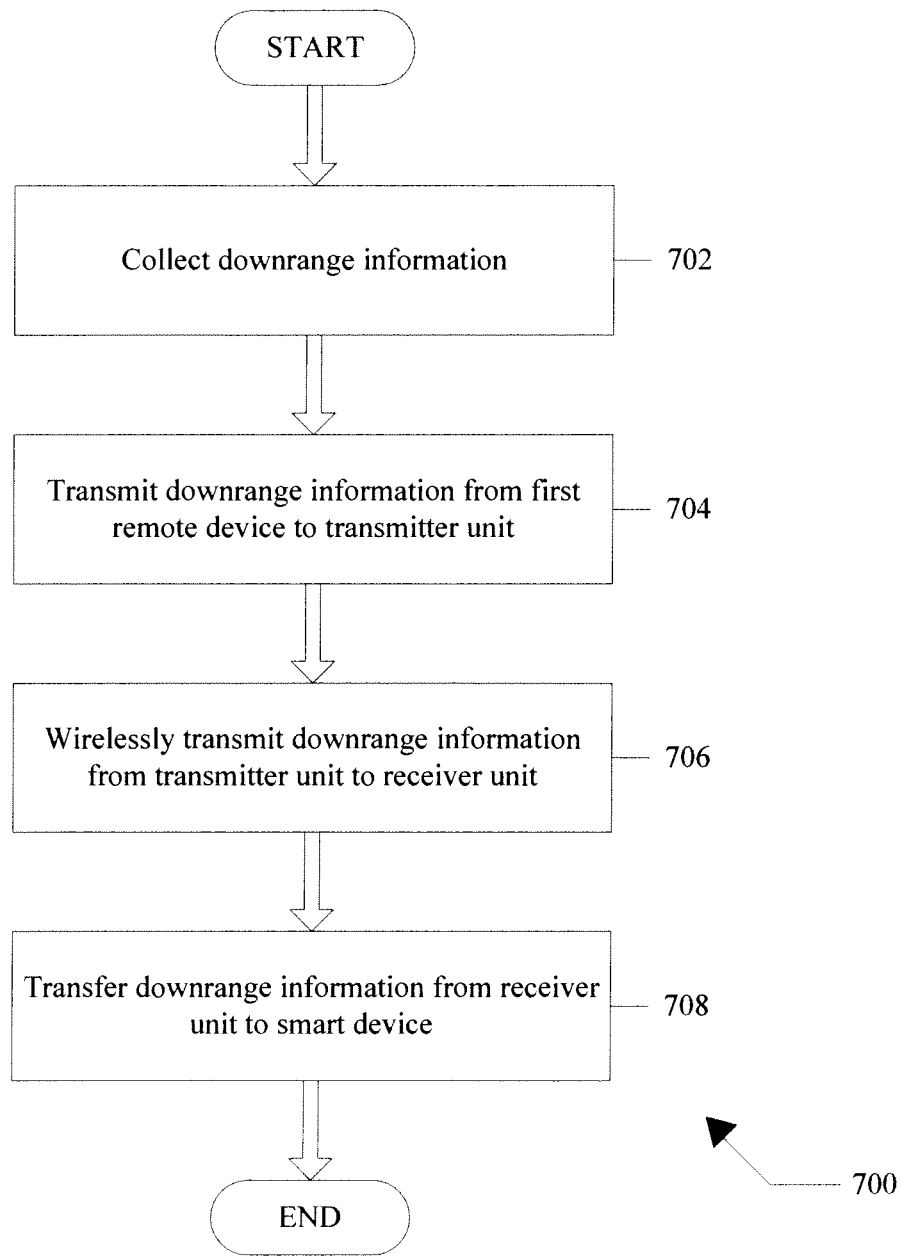
FIG. 7 shows a flowchart of a method for providing downrange information in accordance with one or more exemplary embodiments.
Figure 8:
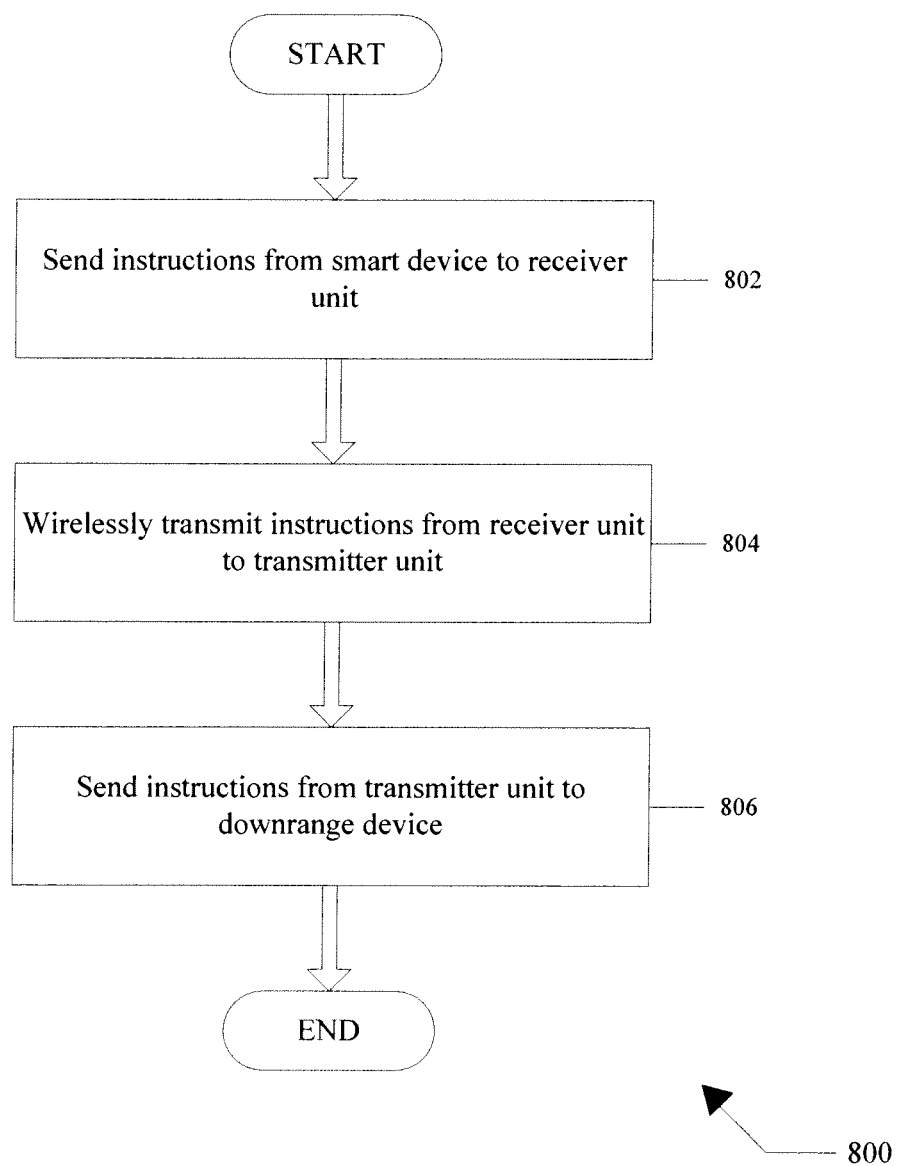
FIG. 8 shows a flowchart of a method for controlling a remote device in accordance with one or more exemplary embodiments.

FIG. 7 shows a flowchart of a method 700 for providing downrange information in accordance with one or more exemplary embodiments. FIG. 8 shows a flowchart of a method 800 for controlling a downrange device in accordance with one or more exemplary embodiments. While the various steps in these flowcharts are presented and described sequentially, one of ordinary skill will appreciate that some or all of the steps may be executed in different orders, may be combined or omitted, and some or all of the steps may be executed in parallel. Further, in one or more of the exemplary embodiments of the invention, one or more of the steps described below may be omitted, repeated, and/or performed in a different order. In addition, a person of ordinary skill in the art will appreciate that additional steps, omitted in FIG. 7 and/or FIG. 8, may be included in performing one or both of these methods. Accordingly, the specific arrangement of steps shown in FIGS. 7 and 8 should not be construed as limiting the scope of the invention. Further, one or more steps in this method 700 and/or method 800 can be performed using a computing device, as described above with respect to FIG. 6.

With respect to the method 700 of FIG. 7, referring to FIGS. 1-7, downrange information is collected in step 702. The downrange information can be collected using a first remote device 240. The downrange information can be collected by the first remote device 240 based on instructions from a user, on a continuous basis, based on the occurrence of some event (e.g., motion sensing, passage of time), or based on some other factor.

In step 704, the downrange information collected by the first remote device 240 is transmitted from the first remote device 240 to a transceiver unit 110. More specifically, the downrange information collected by the first remote device 240 can be transmitted from the first remote device 240 to the communication engine 250 of the transceiver unit 110. The downrange information can be transmitted from the first remote device 240 to a transceiver unit 110 using a local network 115.

In step 706, the downrange information is wirelessly transmitted from the transceiver unit 110 to a transceiver unit 120. In certain example embodiments, the downrange information is wirelessly transmitted using a bridge network 150. An antenna 260 coupled to the communication engine 250 of the transceiver 110 and/or an antenna 360 coupled to the communication engine 350 of the transceiver 120 can be used to direct the bridge network 150.

In step 708, the downrange information is transferred from the transceiver unit 120 to a smart device 130. In certain example embodiments, the downrange information is transferred using a second local network 125. The downrange information can be processed using an application on the smart device 130. The remote device 140 can be one or more of a number of devices. Similarly, the downrange information can be one or more of a number of types of information. For example, the remote device 240 can be an image capturing device, and the downrange information can be an image of a target.

In certain example embodiments, additional steps may be involved in the method 700. For example, instructions can be sent from the smart device 130 to the remote device 240. The instructions can cause the remote device 240 to respond in one or more of a number of ways. For example, the instructions can direct the remote device 240 to collect the downrange information, change direction, and turn on/off. The instructions can be sent from the smart device 130 to the remote device 240 using the second local network 125, the bridge network 150, and the first local network 115, Information captured by one or more remote devices can be compared to each other and/or, from a single device, can be compared over time. For example, for when the remote device 240 is an image capturing device, and the downrange information is an image of a target, a subsequent image captured by the image capturing device 240 can be transmitted from the image capturing device to the transceiver unit 110 using the first local network 125. Then, the subsequent image of the target can be wirelessly transmitted, using the bridge network 150, from the transceiver unit 110 to the transceiver unit 120. Then, the subsequent image can be transferred, using the second local network 115, from the transceiver unit 120 to the smart device 130. In such a case, the application on the smart device 130 can detect and display a change between the image and the subsequent image.

With respect to the method 800 of FIG. 8, referring to FIGS. 1-6 and 8, instructions are sent from the smart device 130 to the transceiver unit 420 in step 802. The instructions can be sent using an application on a smart device 130 and using a first local network 125. In step 804, the instructions can be wirelessly transmitted from the transceiver unit 120 to a first transceiver unit 110. The instructions can be transmitted using a bridge network 150. In certain example embodiments, the transceiver unit 120 can be located remotely from the first transceiver unit 110.

In step 806, the instructions are sent from the first transceiver unit 110 to the downrange device 240. The instructions can be sent using a second local network 115. In certain example embodiments, the downrange device can be controlled using the instructions.

In certain example embodiments, additional instructions can be sent, either to the same remote device or to a different remote device. If the additional instructions are sent to a different remote device, such different remote device can be communicably coupled to the same or a different transmitting unit. For example, in a system 500 such as shown in FIG. 5 above, subsequent instructions can be sent, using the application on the smart device 130 and the first local network 525, from the smart device 130 to the transceiver unit 520. Then, the subsequent instructions can be wirelessly transmitted, using the bridge network 550, from the transceiver unit 520 to the first transceiver unit 510.

The subsequent instructions can then be sent, using a third local network 515, from the first transceiver unit 510 to a second transceiver unit 511, where the first transceiver unit 510 and the second transceiver unit 511 are located proximate to each other. The subsequent instructions can then be sent from the second transceiver unit 511 to an additional downrange device that is communicably coupled to the second transceiver unit 511. The additional downrange device can be controlled using the subsequent instructions.

As discussed above, more than one remote device (either communicably coupled to the same or a different transceiver 110) can be used to provide downrange information and/or control a downrange device. For example, the method 700 can include sending, using the second local network, the bridge network, and the first local network, subsequent instructions from the smart device to a second remote device, where the subsequent instructions direct the second remote device to perform a function.

The systems, methods, and apparatuses described herein allow a user to remotely communicate with one or more remote devices. Specifically, example embodiments allow a user, through a smart device, to use a local network at a transceiver to send and/or receive data (information) with one or more remote devices using a wireless bridge network. The remote device can be communicably coupled with a transceiver using another local network.

Example embodiments can allow a user to save time, resources, and energy by not having to be in the area of the remote device to perform an action and/or receive information. Example embodiments can also provide real-time information to a user relative to the remote locations where the remote devices are located. The remote locations using example embodiments can be one mile or more. Further, example embodiments allow for easy installation, maintenance, and disassembly.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:
a first transceiver unit comprising a first communication engine that controls a first local network, wherein the first transceiver unit is positioned at a first location;
a first remote device communicably coupled, using the first local network, to the first transceiver unit, wherein the first remote device is located within a first range of the first local network;
a second transceiver unit comprising a second communication engine that controls a second local network, wherein the second transceiver unit is positioned at a second location;
a smart device comprising an application that is communicably coupled, using the second local network, to the second transceiver unit, wherein the smart device is located within a second range of the second local network, and wherein the smart device is physically separated from the second transceiver unit; and
a bridge network formed by the first transceiver unit and the second transceiver unit, wherein the bridge network wirelessly joins the first local network and the second local network,
wherein the first local network and the second local network are wireless networks.

2. The system of claim 1, wherein the first transceiver unit further comprises a first antenna, wherein the second transceiver unit further comprises a second antenna, and wherein the first antenna and the second antenna are directed toward each other to extend the bridge network.

3. The system of claim 2, wherein the first location and the second location are less than one mile apart.

4. The system of claim 2, wherein the bridge network uses wireless fidelity technology.

5. The system of claim 1, wherein the first remote device is an image capturing device, and wherein the smart device controls a zoom and a direction of the image capturing device using the second local network, the bridge network, and the first local network.

6. The system of claim 5, wherein the first transceiver unit further comprises a laser to assist in directing the image capturing device.

7. The system of claim 1, wherein the second transceiver unit further comprises a jack for charging the smart device, wherein the jack is built into a carrying case of the second transceiver unit.

8. The system of claim 1, wherein the first remote device performs an active function based on signals received from the smart device through the second local network, the bridge network, and the first local network.

9. The system of claim 1, wherein the first remote device performs a passive function based on signals received from the smart device through the second local network, the bridge network, and the first local network.

10. The system of claim 1, further comprising:
a third transceiver unit comprising a third communication engine that controls a third local network, wherein the third transceiver unit is positioned at a third location; and
a second remote device communicably coupled, using the third local network, to the third transceiver unit,
wherein the bridge network wirelessly communicably couples the third transceiver transmitter unit to the receiver unit, and
wherein the third local network is a wireless network.

11. The system of claim 1, further comprising:
a third transceiver unit comprising a third communication engine that communicably couples, using the first local network, the third transceiver unit to the first transceiver unit; and
a second remote device communicably coupled, using the first local network, to the third transceiver unit,
wherein the third transceiver unit is positioned in a third location that is within range of the first local network.

12. The system of claim 11, further comprising:
a fourth transceiver unit comprising a fourth communication engine that communicably couples, using a third local network, the fourth transceiver unit to the first transceiver unit; and
a third remote device communicably coupled, using the third local network, to the fourth transceiver unit,
wherein the third local network is a wireless network.

13. The system of claim 1, wherein the first remote device is part of the first transceiver unit.

14. A method for providing downrange information, comprising:
- collecting, using a first remote device, the downrange information;
- transmitting, using a first local network generated by a first transceiver unit, the downrange information collected by the first remote device from the first remote device to the first transceiver unit, wherein the first remote device is located within a first range of the first local network;
- wirelessly transmitting, using a bridge network, the downrange information from the first transceiver unit to a second transceiver unit, wherein the bridge network is formed by the first transceiver unit and the second transceiver unit, wherein the bridge network wirelessly joins the first local network and the second local network; and
- transferring, using a second local network generated by the second transceiver unit, the downrange information to a smart device, wherein the smart device is located within a second range of the second local network, wherein the smart device is physically separated from the second transceiver unit, and wherein the downrange information is processed using an application on the smart device.

15. The method of claim 14, further comprising:
- sending, using the second local network, the bridge network, and the first local network, instructions from the smart device to the first remote device, wherein the instructions direct the first remote device to collect the downrange information.

16. The method of claim 14, wherein the first remote device is an image capturing device, and wherein the downrange information is an image of a target.

17. The method of claim 16, further comprising:
- transmitting, using the first local network, a subsequent image captured by the image capturing device from the image capturing device to the first transceiver unit;
- wirelessly transmitting, using the bridge network, the subsequent image of the target from the first transceiver unit to the second transceiver unit; and
- transferring, using the second local network, the subsequent image from the second transceiver unit to the smart device,
- wherein the application on the smart device detects and displays a change between the image and the subsequent image.

18. The method of claim 14, further comprising:
- sending, using the second local network, the bridge network, and the first local network, subsequent instructions from the smart device to a second remote device, wherein the subsequent instructions direct the second remote device to perform a function.

19. A method for controlling a downrange device, the method comprising:
- sending, using an application on a smart device and a first local network, instructions from the smart device to a first transceiver unit, wherein the smart device is located within a first range of the first local network, and wherein the smart device is physically separated from the first transceiver unit;
- wirelessly transmitting, using a bridge network, the instructions from the first transceiver unit to a second transceiver unit, wherein the first transceiver unit is located remotely from the second transceiver unit; and
- sending, using a second local network, the instructions from the second transceiver unit to the downrange device, wherein the downrange device is located within a second range of the second local network,
- wherein the bridge network is formed by the first transceiver unit and the second transceiver unit, wherein the bridge network wirelessly joins the first local network and the second local network, and wherein the downrange device is controlled using the instructions.

20. The method of claim 19, further comprising:
- sending, using the application on the smart device and the first local network, subsequent instructions from the smart device to the first transceiver unit;
- wirelessly transmitting, using the bridge network, the subsequent instructions from the first transceiver unit to the second transceiver unit;
- sending, using a third local network, the subsequent instructions from the second transceiver unit to a third transceiver unit, wherein the second transceiver unit and the third transceiver unit are located proximate to each other; and
- sending the subsequent instructions from the third transceiver unit to an additional downrange device,
- wherein the additional downrange device is controlled using the subsequent instructions.

* * * * *